Aug. 8, 1933.                E. W. ROBERTS                1,921,779
                               GAS COCK
                          Filed March 21, 1932
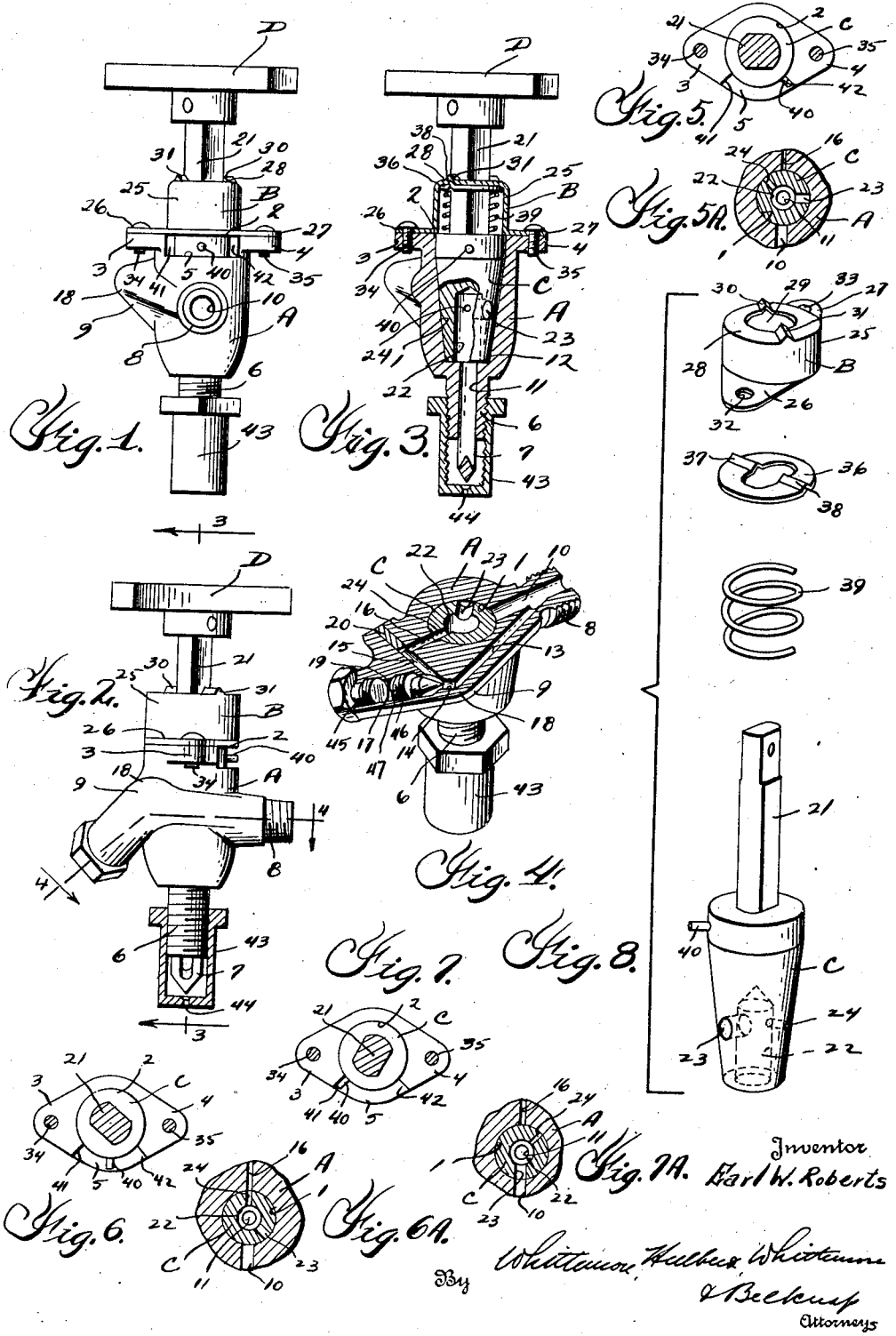

Patented Aug. 8, 1933

1,921,779

UNITED STATES PATENT OFFICE 1,921,779

GAS COCK

Earl W. Roberts, Detroit, Mich., assignor to Roberts Brass Manufacturing Company, Detroit, Mich., a Corporation of Michigan Application March 21, 1932. Serial No. 600,281

11 Claims. (Cl. 277—53)

This invention relates generally to valve assemblies, especially gas cocks of the rotary plug type, and consists of certain novel details of construction, combinations and arrangements of parts, that will be hereinafter more fully described and particularly pointed out in the appended claims.

In the accompanying drawing:

Figure 1 is a side elevation of a gas cock embodying my invention and showing the rotary plug in the intermediate low flame position;

Figure 2 is a view similar to Figure 1 but taken at right angles thereto;

Figure 3 is a sectional view taken on the line 3—3 of Figure 2;

Figure 4 is a sectional view taken on the line 4—4 of Figure 2;

Figures 5 and 5A respectively are diagrammatic views in section showing the position of the parts when the rotary plug is in closed position;

Figures 6 and 6A respectively are views similar to Figures 5 and 5A but showing the parts when the rotary plug is in the intermediate or low flame position;

Figures 7 and 7A are views similar to Figure 6 but showing the parts in the fully opened or high flame position;

Figure 8 is a group perspective of the parts of my gas cock except the casing and handle.

Referring now to the drawing, A is the casing; B is a cap for one end of the casing; C is the rotary plug; and D is the operating handle of a valve embodying my invention. As shown, the casing A is a casting and is provided with a longitudinally extending tapered socket 1 that opens outwardly through the end 2 thereof and constitutes a seat for the rotary plug C. At this end 2 the casing A is provided at diametrically opposite points with laterally projecting flanges 3 and 4 and is provided between said flanges around part of the socket with an arcuate recess or slot 5, while at its other end the casing is provided with a reduced exteriorly threaded extension 6 having an apertured flattened end 7. Intermediate of its ends the casing A has a laterally projecting exteriorly threaded portion 8 and a laterally projecting enlargement 9 of substantially V configuration. Preferably a passage 10 extends longitudinally of the threaded portion 8 to the socket 1 and constitutes an inlet for gas, while a passage 11 extends longitudinally of the extension 6 from the base 12 of the socket to the apertured flattened end 7 and constitutes an outlet for the gas. For by-passing the gas from the inlet passage 10 to the socket 1 at a point substantially diametrically opposite the inlet passage, I have provided four restricted passages 13, 14, 15 and 16 respectively and an intermediate socket 17. Preferably the passage 13 extends from one side of the inlet passage 10 adjacent the outer end of the portion 8 to approximately the apex 18 of the V-shaped enlargement and is substantially tangent to the socket 1. The passage 14 and socket 17 are arranged end to end in a line disposed at substantially an obtuse angle to the passage 13 with the passage 14 leading from the rear end of the passage 13 and the socket 17 opening outwardly through one end of the V-shaped enlargement 9. Preferably the socket 17 has a larger diameter than the passage 14 and is provided with internal threads 19. The passage 15 is disposed at substantially an obtuse angle to the passage 13 and extends from the juncture of the passage 13 and socket 17 at substantially an acute angle to the latter to the opposite side of the enlargement 9. A plug 20 closes the outer end of this passage 15, while the passage 16 extends from the passage 15 at a point substantially midway of its ends radially of the casing A to the socket 1.

The plug C conforms in shape to and is mounted to turn in the socket 1 and has an integral stem 21 carrying the operating handle D. Preferably the plug C has a longitudinally extending passage 22 registering with the outlet passage 11 in the casing and has two transversely extending passages 23 and 24 respectively. As shown, the arrangement is such that the passage 23 is out of registration with the passage 10 when the passage 24 is in registration with the passage 16 and vice versa.

The cap B is preferably formed of sheet metal and has a cup-shaped portion 25 registering with the socket 1, and laterally extending attaching flanges 26 and 27 respectively resting on the lateral flanges 3 and 4 respectively of the casing. Preferably the base 28 of the cup-shaped portion 25 has a central opening 29 that receives the stem 21 and is provided at diametrically opposite sides of said opening with radially extending grooves 30 and 31 respectively, while the flanges 26 and 27 have circular openings 32 and 33 respectively therein for the reception of suitable bolts 34 and 35 threadedly engaging the flanges 3 and 4. A washer 36 is non-rotatably sleeved upon the stem 21 within the cup-shaped portion 25 and is provided at diametrically opposite points with radially extending ribs or corrugations 37 and 38 respectively for engagement with the grooves 30 and 31. A coil spring 39 sleeved upon the stem 21 between the casing B and washer 36 constantly urges the latter toward the base 28 of the cup-shaped portion 25, the arrangement being such that the corrugations 37 and 38 are adapted to snap into engagement with the grooves 30 and 31 when the passage 24 in the plug C registers with the passage 16 in the casing A. Referring to the drawing it will also be noted that the plug C is provided at one side adjacent the enlarged end thereof with a laterally projecting pin 40 that is movable in the arcuate slot 5 whereby the pin may engage opposite ends 41 and 42 respectively of said slot to limit the turning movement of the plug.

In use when the pin 40 abuts the right end 42 of the slot 5 the passages 23 and 24 are both out of registration with the passages 10 and 16, hence the supply of gas to the outlet passage 11 is cut off entirely and the valves closed. When in this position the corrugations 37 and 38 are likewise out of registration with the grooves 30 and 31. Should a constant low flame be desired the plug C is then turned to the left until the corrugations 37 and 38 snap into the grooves 30 and 31 whereupon the passage 24 will register with the passage 16 and gas will flow from the inlet passage 10 through the by-passages 13, 14, 15 and 16 respectively to the passages 24 and 22 in the plug. Thus the intermediate low flame position will be accurately and automatically obtained without the necessity of looking at the flame or guessing how far the plug should be turned. Moreover it is unnecessary to move the handle and stem longitudinally relative to the casing, and the snap engagement of the corrugations 37 and 38 with the grooves 30 and 31 upon merely turning the handle will not only indicate the correct intermediate position but will effectively stop and hold the plug in such position. In this connection it will be noted that there is a cap 43 upon the threaded extension 6 and provided at its outer end with an aperture 44 through which the gas from the outlet passage 11 may flow to the usual mixing tube (not shown), and that there are two elements 45 and 46 respectively engaging the threads 19 in the socket. The element 46 is a needle valve for controlling the flow of gas from the passage 14 to the passage 15, while the element 45 is a plug or closure for the outer end of the socket. When it is desired to adjust the needle valve 46, the plug 45 is removed and a screw driver (not shown) is engaged with the transversely extending slot 47 in the outer end of said valve to turn the same. Should it be desired to have a high flame then the plug C is turned to the left until the pin 40 abuts the end 41 of the slot 5 whereupon the passage 23 will be in registration with the inlet passage 10, and the passage 24 will be out of registration with the passage 16. When in this position the gas is free to flow directly into the longitudinally extending passage 22 in the plug to the outlet passage 11 in the casing.

Thus from the foregoing it will be apparent that I have provided an extremely efficient valve wherein provision is made for flames of various heights and wherein a predetermined, constant and uniform low flame may be accurately obtained.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a gas cock, a casing having a socket, a transversely extending inlet passage leading to the socket, a longitudinally extending outlet passage leading from the socket, and means for by-passing gas from the inlet passage to the socket, and means for controlling the flow of gas from the inlet passage to the outlet passage including a rotary plug in the socket having a longitudinal passage registering with the outlet passage and having two transversely extending passages, one being registrable with the inlet passage, and one being registrable with the by-pass means, the arrangement being such that when one is in registration the other is not in registration and vice versa.

2. In a valve, a casing having a socket, a transversely extending inlet passage leading to the socket, a longitudinally extending outlet passage leading from the socket, and a by-pass extending from the inlet passage to the socket, and a rotary plug in the socket having a longitudinal passage registering with the outlet passage and having two transversely extending passages, one being registrable with the inlet passage, and one being registrable with the by-pass, the arrangement being such that when one is in registration, the other is not in registration and vice versa.

3. In a valve, a casing comprising a casting having a socket opening outwardly through one end thereof and provided at its other end with an exteriorly threaded extension, said casing being provided intermediate of its ends with a laterally projecting exteriorly threaded portion and a laterally projecting enlargement of substantially V configuration, passage extending longitudinally of the threaded portion to the socket and constituting an inlet, a passage extending longitudinally of the extension from the bottom of the socket and constituting an outlet, and a by-pass between said inlet and socket including a restricted passage extending from one side of the inlet to a point adjacent the apex of the V enlargement and disposed substantially tangent to the socket, a second restricted passage and a socket arranged end to end in a line at substantially an obtuse angle to the first restricted passage with the second restricted passage leading from the rear end of the first restricted passage and the socket opening outwardly through one end of the V-shaped enlargement, a third restricted passage extending from the juncture of the second restricted passage and socket, and a fourth restricted passage extending from the third restricted passage to the socket.

4. In a valve, a casing comprising a casting having a socket opening outwardly through one end thereof and provided at its other end with an extension, said casing being provided intermediate of its ends with a laterally projecting portion and a laterally projecting enlargement, a passage extending longitudinally of the laterally projecting portion to the socket and constituting an inlet, a passage extending longitudinally of the extension from the bottom of the socket and constituting an outlet, and a by-pass between said inlet and socket including a restricted passage extending from one side of the inlet, a second restricted passage and a socket arranged end to end with the second restricted passage leading from the rear end of the first restricted passage and the socket opening outwardly through the enlargement, a third restricted passage extending from the juncture of the second restricted passage and socket, and a fourth restricted passage extending from the third restricted passage to the socket, a rotary plug in the socket having a longitudinal passage registering with the outlet passage and having transversely extending passages registrable with the inlet passage and fourth restricted passage, and a valve in the socket controlling the flow of gas from the second to the third restricted passages.

5. In a valve, a casing having a longitudinally extending socket, a transversely extending inlet passage leading to the socket, a longitudinally extending outlet passage leading from the socket, and a transversely extending by-pass leading from the inlet passage to the socket, a rotary plug in the socket having a longitudinally extending passage registering with the longitudinally extending passage in the casing, and having two transversely extending passages, one being registrable with the inlet passage, and one being registrable with the by-pass a stem projecting endwise from the plug, a sheet metal cap secured to the casing and having a cup-shaped portion opening toward and registering with the socket, the base of the cup-shaped portion having an opening receiving the stem and being provided at diametrically opposite sides thereof with radially extending embossed portions providing grooves, and means for arresting the plug and producing a clipping noise when one of the transverse passages therein is in registration with the by-pass in said casing, including a spring pressed washer non-rotatably sleeved on said stem within said cup-shaped portion and having projections at diametrically opposite points thereof engageable with the groove aforesaid.

6. In a valve, a casing having a socket and provided with an exteriorly threaded extension, said casing being also provided with a laterally projecting exteriorly threaded portion and a laterally projecting enlargement, a passage extending longitudinally of the threaded portion to the socket and constituting an inlet, a passage extending longitudinally of the extension from the bottom of the socket and constituting an outlet, and a by-pass between said inlet and socket including a passage extending from the inlet substantially tangent to the socket, a second passage extending from and arranged at substantially an obtuse angle to the first passage, a third passage extending from and disposed at substantially an obtuse angle to the second passage, and a fourth passage extending at substantially right angles from the third passage to the socket.

7. In a valve, a casing having a socket and provided with an exteriorly threaded extension, said casing being also provided with a laterally projecting exteriorly threaded portion and a laterly projecting enlargement, a passage extending longitudinally of the laterally projecting exteriorly threaded portion to the socket and constituting an inlet, a passage extending longitudinally of the extension from the bottom of the socket and constituting an outlet, and a by-pass between said inlet and socket including a passage extending from the inlet substantially tangent to the socket, a second passage and a socket arranged end to end in a line at substantially an obtuse angle to the first passage with the second passage leading from the first passage and the socket opening outwardly through the enlargement, a third passage extending from the juncture of the second passage and socket, and a fourth passage extending from the third passage to the socket.

8. In a valve, a casing having a longitudinally extending socket, a transversely extending inlet passage leading to the socket, a longitudinally extending outlet passage leading from the socket, and a transversely extending by-pass leading from the inlet passage to the socket at a point substantially diametrically opposite the inlet passage, and a rotary plug in the socket having a longitudinally extending passage constantly registering with the longitudinally extending passage in the casing and having two transversely extending passages leading from the longitudinally extending passage and disposed at substantially obtuse angles to each other, one of the transverse passages in said plug being registrable with the inlet passage in the casing, and the other of the transverse passages in the plug being registrable with the by-pass in the casing.

9. In a gas cock, a casing having a longitudinally extending socket, a transversely extending inlet passage leading to the socket, a longitudinally extending outlet passage leading from one end of the socket, and a by-pass extending transversely of the casing from the inlet passage to the socket, and means for controlling the flow of gas from the inlet to the socket and from the by-pass to the socket, including a rotary plug in the socket having a longitudinally extending passage constantly registering with the outlet passage and having two transversely extending passages, one being registrable with the inlet passage, and one being registrable with the by-pass, the arrangement being such that when one is in registration, the other is out of registration and vice versa.

10. In a valve, a casing having a longitudinally extending socket, a transversely extending inlet passage leading to the socket, a longitudinally extending outlet passage leading from the socket, a transversely extending socket, and a by-pass leading from the inlet passage to the longitudinally extending socket and having a straight portion substantially in alignment with and opening into the transversely extending socket, a rotary plug in the longitudinally extending socket having a longitudinally extending passage constantly registering with the outlet passage and having two transversely extending passages, one being registrable with the inlet passage, and one being registrable with the by-pass, the arrangement being such that one is out of registration when the other is in registration and vice versa, and means for controlling the flow to the longitudinally extending passage in the plug when one of the transverse passages therein is in registration with the by-pass, including an element adjustable in the transversely extending socket relative to the straight portion of the by-pass.

11. In a valve, a casing having a longitudinally extending socket, a transversely extending inlet passage leading to the socket, a longitudinally extending outlet passage leading from the socket, a transversely extending socket, and a transversely extending by-pass leading from the inlet passage to the longitudinally extending socket and having a portion opening into the transversely extending socket, a rotary plug in the longitudinally extending socket having a longitudinally extending passage registering with the outlet passage and having two transversely extending passages, one being registrable with the inlet passage, and one being registrable with the by-pass, the arrangement being such that one is out of registration when the other is in registration and vice versa, and means for controlling the flow to the longitudinally extending passage in the plug when one of the transverse passages therein is in registration with the by-pass, including an element adjustable in the transversely extending socket.

EARL W. ROBERTS.